United States Patent [19]

Jennings

[11] Patent Number: 5,261,145
[45] Date of Patent: Nov. 16, 1993

[54] SELF-ACTUATING LOUVERED CLAMP

[75] Inventor: Ralph N. Jennings, Elyria, Ohio

[73] Assignee: Triad Metal Products Company, Cleveland, Ohio

[21] Appl. No.: 656,982

[22] Filed: Feb. 19, 1991

[51] Int. Cl.⁵ .............................................. F16L 33/02
[52] U.S. Cl. ...................................................... 24/20 R
[58] Field of Search ......... 285/252; 24/20 R, 20 CW, 24/20 EE, 20 TT, 20 LS, 20 W, 20 S, 21, 22, 23 R, 23 B, 23 W, 23 EE; 81/64

[56] References Cited

U.S. PATENT DOCUMENTS

| | | | |
|---|---|---|---|
| 672,668 | 4/1901 | Devine | 24/20 R |
| 2,249,764 | 7/1941 | Hothersall | 24/20 EE |
| 3,452,318 | 6/1969 | Tanges, Jr. | 24/16 PB X |
| 4,275,485 | 6/1981 | Hutchison . | |
| 4,310,956 | 1/1982 | Meckstroth et al. | 24/20 LS X |
| 4,402,113 | 9/1983 | Smith | 24/23 R X |
| 4,517,708 | 5/1985 | Calmettes et al. . | |
| 4,556,241 | 12/1985 | Weinhold | 285/252 X |
| 4,713,863 | 12/1987 | Jennings . | |
| 4,910,832 | 3/1990 | Schaub et al. | 24/20 R |

FOREIGN PATENT DOCUMENTS

| | | | |
|---|---|---|---|
| 323555 | 8/1902 | France | 285/252 |
| 287973 | of 1928 | United Kingdom | 81/64 |
| 1013380 | 12/1965 | United Kingdom | 24/20 EE |

*Primary Examiner*—James R. Brittain
*Attorney, Agent, or Firm*—Oldham, Oldham & Wilson Co.

[57] ABSTRACT

A reusable openable/closeable clamp comprising an arcuate-like strap having two generally opposing, spaced ends, each of which has been bent outwardly of the general periphery of the clamp to form first and second ears with one of the ears having an aperture therein and the other of the ears having a projection thereon extending outwardly from its respective ear, with the projection being adapted to be received in the aperture in the closed condition of the clamp to hold the strap in closed clamping condition, said strap further having at least two raised segments forming a restraining means between said segments. Removal of the projection from the aperture enables the clamp to spring to open position due to the natural resiliency of the strap portion.

7 Claims, 4 Drawing Sheets

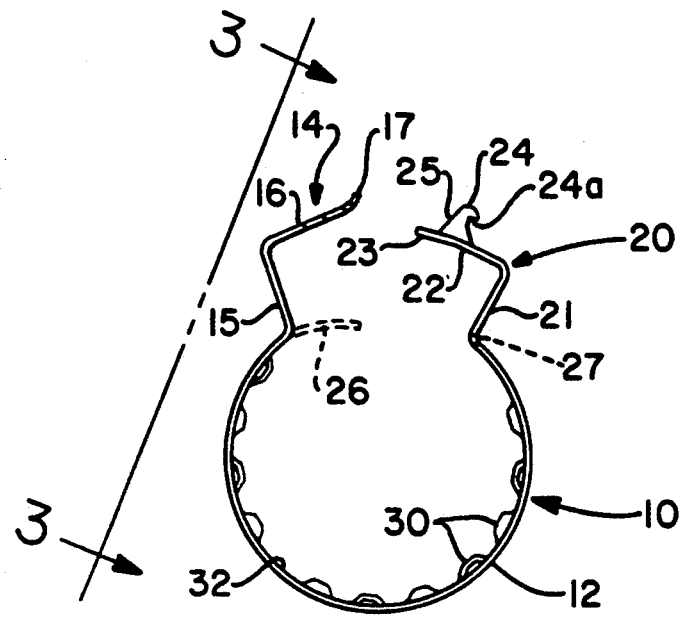
FIG.-1
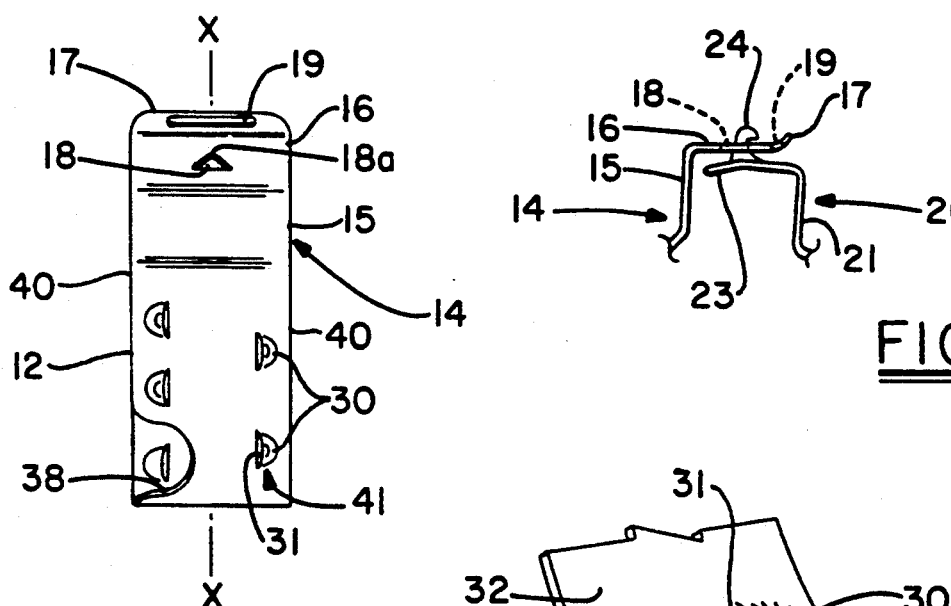
FIG.-2
FIG.-3
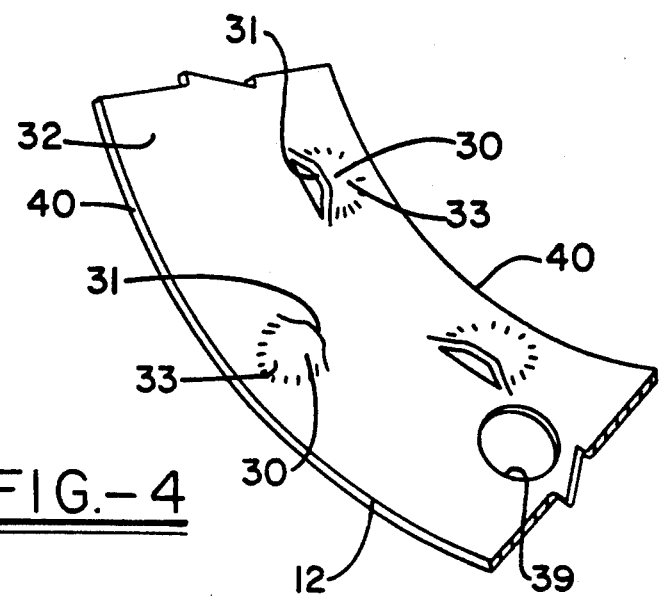
FIG.-4

SELF-ACTUATING LOUVERED CLAMP

This invention relates to clamps used in fastening and/or clamping together fittings that either attach to or are an integral part of a flexible, semi-flexible or rigid structure.

More particularly, this invention relates to a actuatable, locking, open-type, reusable clamp that includes an arcuate strap having a locking means on each end of said strap which are adapted to allow locking and unlocking or closing and opening of said clamp and at least one pair of rows of parallel inward projections which form a restraining means which may be a groove, a valley-like portion or a flat portion of the strap between the pair of rows or inward projections.

BACKGROUND OF THE INVENTION

Reusable open type clamps are known in the prior art and are disclosed, for instance in U.S. Pat. No. 4,275,485 dated Jun. 30, 1981 to Hutchison, U.S. Pat. No. 4,517,708 dated May 21, 1985 to Calmettes et al. and U.S. Pat. No. 4,713,863 dated Dec. 22, 1987 to Jennings. The Jennings patent describes a reusable clamping device for securing flexible tubing onto a coacting rigid tube or pipe. Such prior art clamps are generally designed to insure sufficient clamping force to keep a tube connected to a pipe and thus, require a smooth arcuate strap portion.

SUMMARY OF THE INVENTION

An object of the invention is to provide a novel actuatable, resuable, open-type clamp and holding device which may be mass produced.

Other objects, aspects and advantages of the invention will become apparent from the following discussion and drawings described hereinafter.

The clamps of the present invention include an arcuate strap portion, an actuatable, reusable locking means formed from said strap, and at least one pair of rows of parallel inward projections displaced from or in alignment with its neighbor, i.e., the projections can be positioned so that the projections in one row exactly align with the projections of the other row or the projections of one row can be offset by any amount relative to the projections in the other row, formed from or in the arcuate strap.

The clamp can also include as another aspect a plurality of shaped indentions or apertures adapted to accommodate fixtures that may be associated with the fitting that the clamp locks in place. Thus, broadly, the clamp has inward extending portions to grip together the fitting means.

The locking and/or closing means in one aspect includes first and second ears on opposing ends of said strap portion and bent outwardly of the general periphery of the strap portion where the first ear includes at least one aperture therein and the second ear includes at least one locking projection thereon. The apertures on said first ear are adapted for receiving said locking projections on said second ear in a releasable manner for releasably holding the strap of the clamp in a closed clamping condition. The apertures are generally of triangular shape in plane and the locking projections includes an edge adapted for coaction with the apex of the apertures to facilitate entry of the locking projections into the aperture and withdrawal of the locking projection from the aperture.

Another and preferred aspect of the clamps of the present invention include clamps where the locking projections are a hook shaped configuration and is formed of the material of the associated ear portion and is bent out of the plane thereof, so as to extend outwardly of the associated ear portion. The clamps of the present invention can also include an extension directed generally along the periphery of the arcuate body portion of the clamp and toward the first ear thereof and which is formed of the material of the strap.

The row of parallel inward projections can be attained in a number of different ways well known in the art. The projections can be inwardly half dome shaped projections made by lancing the strap and punching a half dome projection where the domed shape is pointed toward the outside of the strap and the lance is pointed toward the interior of the strap. Alternately, the row can be a continuous ridge impress on the outer surface of the strap so that the ridges project inwardly. Another alternative involves the use of inwardly hill shaped projections where the strap has been lanced and an area of the strap extending from the lance to an other edge of the strap, has been pushed inwardly to form the hill-like projection.

The rows are adapted to provide a restraining means which may be a groove, valley-like portion of the strap or flat portion between the rows of inward projection on the inside surface of the arcuate strap. When the clamp is in the closed and locked position, the clamp restrains the clamped material in a circumferential manner while the restraining means prevents the clamped material or fittings from separating axially. This restrain is accomplished by the fact that the projections are inwardly disposed so that the fitting must either break the projections or rupture in order to separate in an axial manner. The restraining means is designed to resist the axial separation of the fitting even if the fittings are subjected to internal pressure. The restraining means can withstand from about 1 atmosphere of excess pressure to about 50 atmospheres or more of excess pressure emanating from the fittings. Preferably, the restraining means can resist pressures from about 2 to about 25 atmosphere and more particularly from about 2 to 10 atmospheres of pressure.

The clamps of the present invention are ideally suited for clamping end fittings of a fuel injection rail, viz. those commonly found on all fuel injected internal combustion engines.

The present invention provides a novel actuatable, reusable open type clamp which comprises a first closing means on one end of the arcuately formed strap member thereof, and a complementary closing means in the other end thereof adapted to receive the projection from the first closing means therein and to hold the clamp in closed clamping condition. The clamp can be readily opened by causing movement of the projection of the first closing means of the clamp out of engaged relation with the periphery of the aperture in the complementary or second closing means. The clamp further comprises at least two rows of longitudinal parallel inward projections on the strap which form a restraining means which may be a groove, valley-like portion or flat portion of the strap between the longitudinal rows of inward projection for securing a connection between two fittings associated with a rigid, semi-rigid or flexible component. The rows of inward projections can be formed from the material of the strap or by adhering material added onto the inside of the strap. The rows of inward projections can be placed near the strap edges so that the projections are separated from the edge or the projections can incorporate the edges. Preferably the portion of the projection which points away from the edge closest to the row is such that a portion of the projection is parallel to the strap edge. This projection portion parallel to the strap edge improves the contact between the projection and the fitting and thereby improves the restraining effect of the projections. However, any shape of the projections would be adequate because the fitting contained within the restraining means defined by the rows of projections would have to either flatten, break or otherwise destroy the projections or the fitting would have to fail in order for the fitting to escape the restraining means.

BRIEF DESCRIPTION OF THE DRAWINGS

FIG. 1 is a side elevational view of a first embodiment of a clamp of this invention, with the clamp being in open condition.

FIG. 2 is a partial end elevational view of the clamp of FIG. 1 with the clamp in a closed condition.

FIG. 3 is an end elevational view in partial section of the clamp taken along line 3—3 in FIG. 1.

FIG. 4 is a fragmentary view in perspective of an inside surface of the strap of the clamp of FIG. 1.

DESCRIPTION OF PREFERRED EMBODIMENT

The clamp of this invention comprises a reusable, openable-closable, resilient, arcuate clamp made from an arcuate resilient strap that has been molded or die cut to form restraining means in between the edges of said straps when the clamp is closed around a tube, hose, pipe, fitting or the like and has closing means on each end of said strap that cooperate with each other to open and close the clamp.

The restraining means may be made by any of the well known ways of forming or shaping protrusions or projections in material, such as, stamping, dieing, pressing, molding, brazing, welding and such. The restraining means may include at least two parallel rows of inward projections and the surface between the two rows. The restraining means is designed to resist the axial separation of the fitting held in between the rows of projection when the clamp is in a closed and locked condition even if the fittings are subjected to internal pressure. The restraining means can withstand from about 1 atmosphere of excess pressure to about 50 atmospheres or more of excess pressure emanating from the fittings. Preferably, the restraining means can resist pressures from about 2 to about 25 atmosphere and more particularly from about 2 to 10 atmospheres of pressure.

The strap may be made arcuate using a curved die to give the strap the desired arcuate shape, after which each end is bent to form a lower and upper locking end. The closing means includes preferably at least one upward projection of a portion of the material from the lower end of said strap to give a latching means such as a pin, hock or the like and an aperture in said upper end to receive the latching means in locking/unlocking relationship.

Figure 7:
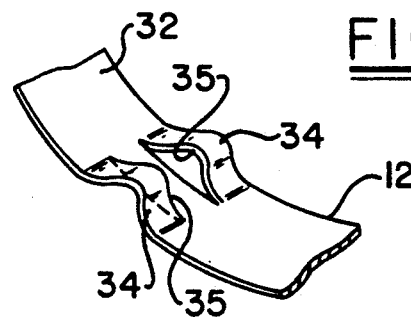
FIG. 7 is a slightly enlarged fragmentary view of an inside surface of the strap of the clamp of FIG. 5.
Figure 11:
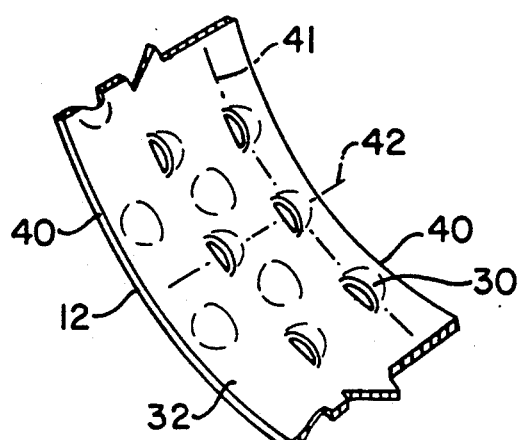
FIG. 11 is a fragmentary view of a clamp of another embodiment of this invention having four parallel rows of inward projections which define two restraining means which may be a groove, valley-like portion or flat strap portion between the rows of inwardly pointing projections.
Figure 12:
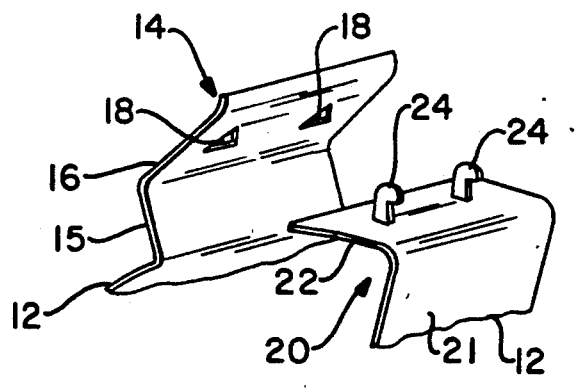
FIG. 12 is a fragmentary view of a clamp of another embodiment of this invention having two locking means associated with the two ends of the clamp with the clamp shown in the open position.

As indicated above, the restraining means may be formed by the usual manner, such as stamping, dieing, or pressing out portions of the arcuate shape assembly to give the desired parallel rows of projections of the strap away from the plane of the strap body 12, usually about 0.2–0.5 centimeters and preferably about 0.3–0.4 centimeters, depending on the size of the clamp, as seen best in FIGS. 1, 3, 4, 5, 7, 10 and 11. FIG. 7 shows the bridge effect, whereas FIGS. 3, 4 and 11 show the single piercing 41 of strap during shaping, for instance stamping, to give the half shell or half dome shape. Also, these knobs, bridges, half dome, triangles and other geometric protrusions or projections can be of varying length from essentially a point 1 centimeter and usually 0.2–0.5 centimeters, depending on the width of the strip, i.e., the distance between the longitudinal side edges 40, 40. Also, these protrusions can be arranged in transverse rows 42, and longitudinal rows 43 depending on the nature of the clamping, pressure and size of the clamp.

Referring now again to the drawings, there is illustrated a clamp 10 which is formed from yieldable and preferably resilient material, such as for instance spring steel, tempered sheet metal or stainless steel and which comprises a strap body 12 formed into a generally arcuate configuration and having generally two opposing ear shaped end portions 14 and 20 bent outwardly of the general periphery of the clamp body 12.

End portion 14 is of generally inverted L-shape configuration in side elevation (FIG. 1) and includes a first portion 15 extending generally radially outwardly from the clamp body 12 and a second portion 16 which extends inward generally perpendicularly from the first portion 15 having an outwardly bent lip 17 at its distal end (FIGS. 1, 2, 5 and 10).

Portion 16 has an opening or aperture 18 formed therein and being preferably of generally triangular configuration (FIG. 2) with the apex 18a thereof being disposed along the general lengthwise center line X—X of end 14 (shown best in FIG. 2) and in a direction toward the outwardly bent distal lip 17. Lip 17 may also include an elongated opening 19 therein as best shown in FIG. 2 for a purpose to be hereinafter set forth.

The other end portion 20 of the clamp includes a first portion 21 which extends angularly outwardly from the plane of the strap body 12, and a second portion 22 disposed angularly to portion 21 and extending toward the first end portion 14. End portion 20 further includes a third portion 23 which extends angularly inward with respect to portion 22. Lip 17 and portion 23 are adapted to facilitate efficient closing and locking of clamp 10. The two elements, lip 17 and portion 23, are disposed in essentially different directions so that when the two end portions are brought together, lip 17 will go smoothly over portion 23 (FIGS. 1 and 2).

Portion 23 includes a projection 24 thereon extending outwardly from end 20 with projection 24 being preferably of hook shaped configuration and including locking lip 24a. Aperture 18 in second portion 16 on end 14 is adapted to receive projection 24 extending from portion 23 of end 20. The locking action is achieved by the interaction of locking lip 24a overlapping the apex 18a of aperture 18 which holds the clamp in closed clamping condition and as shown for instance in FIG. 2. The resistance to deformation of the clamp maintains the aperture and received projection in interlocked coaction.

Closing of the clamp may be accomplished by utilizing a tool, such as a pair of pliers and squeezing the portions 15 and 21 between the jaws of the pliers, to cause movement of the ends toward one another until the projection 24 snaps into aperture 18 with locking lip 24a of the projection overlapping apex 18a of portion 16 (FIG. 2). Thus, in the preferred condition members 22 and 14 will be in contact over a broad area.

The defining edge 25 of the head of projection 24 is preferably arcuate, as shown, commencing at the outer end of locking lip 24a with arcuate edge 25 preferably extending upward and then downward as shown in FIGS. 1, 5, 8 and 12. Arcuate edge 25 facilitates entry of the projection into the receiving opening or aperture 18 upon closing of the clamp, by relative sliding coaction between edge 25 and the periphery of aperture 18, during movement of the ends 14 and 20 toward one another to accomplish closing of the clamp. Edge 25 also facilitates withdrawal of the projection from aperture 18 when the aperture is moved forward relative to the projection when opening of the clamp, with the arcuate edge 25 sliding relative to the defining edge of the aperture 18 to permit ends 14 and 20 to spring open relative to one another.

The clamp may also include an extension 26 at the juncture of the first ear with the strap body 12 and which is preferably formed from the material of end 14 and bent out of the plane thereof so as to project generally toward end 20. The strap body 12 at the juncture of end 20 with the strap body may also be apertured as at 27 and is adapted to receive therethrough the extension portion 26 in the closed clamped condition of the clamp.

The rows of parallel inward projections can be formed into strap body 12 in a number of different ways. One embodiment provides for the projections being a plurality of half dome projections 30 (FIGS. 1, 3 and 4). Projections 30 are configured in such a way that an exposed inwardly projecting edge 31 points away from the nearest edge 40 of strap 12. Edge 31 points inward and is thus adapted to hold or restrain a fitting within a restraining means 32 defined by the two or more, preferably parallel rows, or half domed projections 30. Projections 30 are preferably oriented in a staggered configuration (FIG. 4), i.e., one projection on one row is offset relative to a projection on a second row in such a way that each projection is in between two projections on the other row resulting in triangular configuration or triangular pitch configuration when a projection of one row is positioned between or staggered between projections of a second row to appear as a triangle as shown in FIG. 11, except where the projection end just prior to portion 15 of end 14 and portion 21 of end 20.

Figure 5:
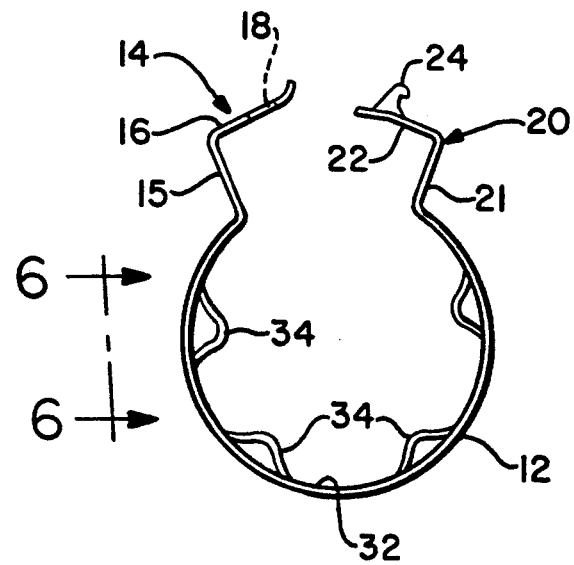
FIG. 5 is a side elevational view of a second embodiment of a clamp of this invention, with the clamp being in open condition.
Figure 6A:
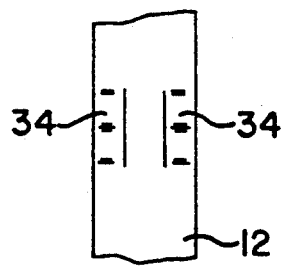
FIG. 6A is an elevational view of the clamp taken along line 6—6 in FIG. 5.
Figure 6B:
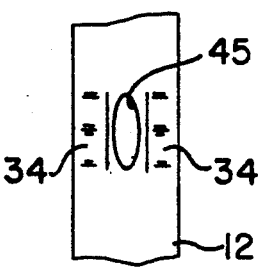
FIG. 6B is an elevational view of the clamp along line 6—6 in FIG. 5 which has the added feature of an elongated aperture.

Another embodiment of the projection of the present invention includes a plurality of inwardly projecting tits or projections, 34 (FIGS. 5-7). Unlike projections 30 which are preferably oriented in a staggered configuration (FIG. 4), projections 34 are oriented in an eclipsing configuration, i.e., a projection on one row faces directly a projection on the other row (FIGS. 6A and 6B) whereby the projections in eclipsing formation of two rows may be seen to form a rectangle as shown by lines 42, 43, 42a and $T^3$ of FIG. 11. Again a restraining means 32 is defined by inside edges 35 of projections 34. FIG. 6B also shows a clamp of this embodiment which encompasses an elongated aperture 45. Aperture 45 extends a sufficient distance from the start of inside edges 35 to minimize stress in the strap 12 and to increase the flexibility and give of the clamp. Although drawing FIG. 6B shows aperture 45 as an elongated shape, apertures having other shapes with more or less material taken from the area between edges 35 would have a similar effect.

Figure 8:
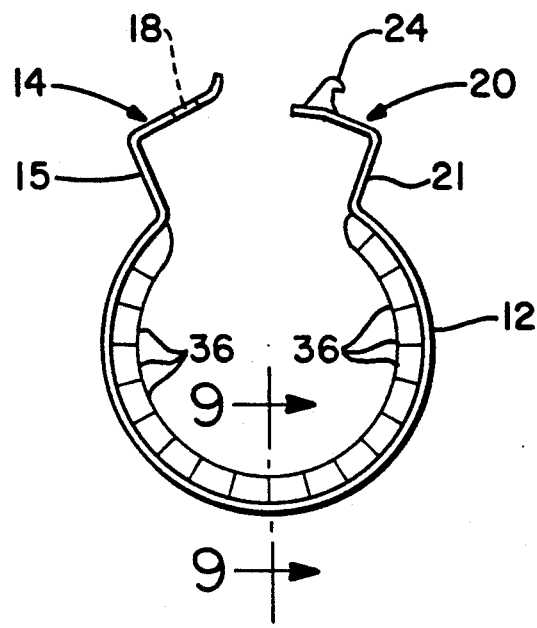
FIG. 8 is a side elevational view of a third embodiment of a clamp of this invention, with the clamp being in open condition.
Figure 9:
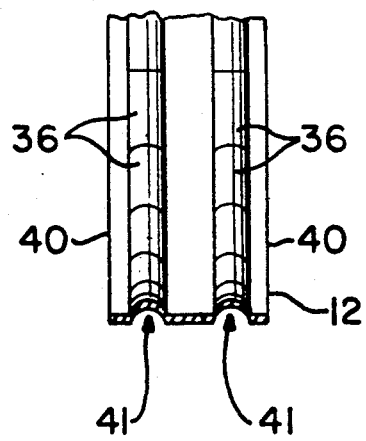
FIG. 9 is an elevational view in section of the clamp taken along the plane defined by line 9—9 in FIG. 8.
Figure 10:
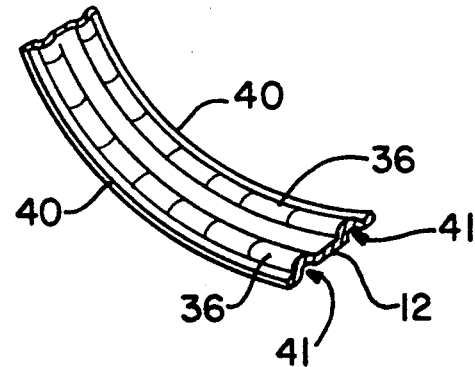
FIG. 10 is a fragmentary view of an inside surface of the strap of the clamp of FIG. 8.

Still another embodiment of the projection includes rows which are continuous ridges 36 inwardly oriented which form continuous valleys 41, as seen from the outside of the strap 12 in FIGS. 8-10. Again a restraining means 32 is defined by inside edges 37 of projections 36.

In all the above embodiments of the parallel rows of projections, restraining means 32 is adapted to restrain fitting so that the fitting cannot slide or separate axially.

Besides the projections formed in strap 12, the strap can have indents 38 (FIG. 3) or apertures 39 (FIG. 4) or any other type of cut out, hook or opening made in strap 12. These indents, apertures or the like are adapted to provide attachments to the fitting constrained within restraining means 32 to protrude from strap 12 to allow the fitting to attach objects in a manner perpendicular to restraining means 32. These indents, aperture or the like are particularly essential in clamps made for securing end fitting on to rails of fuel injection system for internal combustion engines. The rail fittings must be secure and able to withstand a modest amount of pressure without rotation or sliding. Such rotation or sliding could result in gasoline leaks at the fittings. Thus, the restraining means 32, as inward protrusions of this invention, hold the fitting in a tight relation and closed position to prevent leakage even when the fitting is subjected to pressure. The restrain is achieved because the fitting is in direct contact with the projection means inside edges 31, 35 and 37 of the three projections 30, 34 and 36.

While the preferred material for formation of the clamp is spring metal, it will be seen that the clamp might be molded of plastic material, preferably reinforced with sufficient rigidity and resiliency so as to cause it to operate in the manner aforedescribed in connection with a metallic clamp, with the clamp portions being molded instead of being bent. A plastic clamp with presently known plastic materials would probably possess relatively limited strength however, unless reinforced.

The preceding detailed description and drawings disclose a reusable clamp with restraining means which are projections or louvers 30, 34 and 36, having edges 31, 35 and 37 to hold and restrain a fitting against rotational and axial movement within the clamp. Additionally, the louvered clamp of the subject invention includes indents, apertures or the like to adapt the clamp and fitting constrained therein to hold or cling to objects essentially perpendicular to the length of the fitting.

Figure 13:
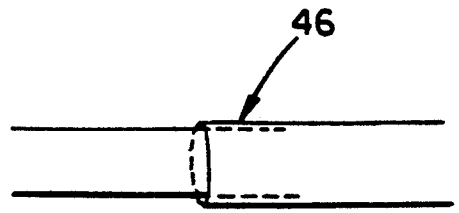
FIG. 13 is a side view of a fitting of a semi-flexible or rigid tubing, tube or pipe.
Figure 14:
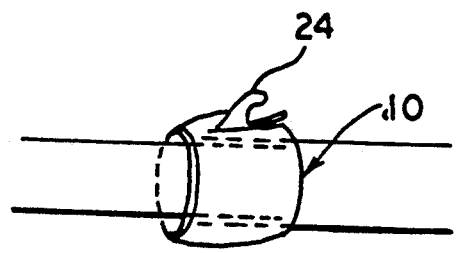
FIG. 14 is a side elevation of the louvered clamp of the invention, the clamp in closed condition and mounted on a fitting.

It is common that two lengths of cylindrical tubing, pipe or other conduit which are adapted to fit together are fitted one over the other by manual or mechanical force to form a fitting 46, FIG. 13. Such cylindrical tubing, pipe or like conduits are used for conveying water, gas, oil or other fluids and gases. A clamp device may be applied at the fitting FIG. 14, to squeeze and hold the two lengths of tubing together. A clamp having internal projections, i.e. the louvered clamp of the present invention can prevent rotation and axial slippage of the fitting in the clamp.

When the clamp is in use, the fitting can be easily installed within the clamp since the empty clamp may be readily unfastened and opened manually to accept the fitting. The fitting can then be inserted into the arcuate strap portion of the clamp. A rail, cord, line, wire or other object 48 may be secured to the clamp which constrains a fitting by manual placement of the rail, cord, wire or other object 48 through the indents 38 or apertures 39 of the clamp FIG. 15. The clamp's open end is susceptible to manual closure by compressing the clamp ends together or, in the alternative, a pliers or gripping device may be required to achieve closure. As a practical matter the end portion 20 having hook-shaped projection thereon 24, must be forcibly brought into proximity with end 14 having aperture 18 to allow projection 24 to extend into aperture 18 and locking lip 24a to overlap and fasten with apex 18a of aperture 18, so as to fasten the clamp in closed configuration.

Figure 15:
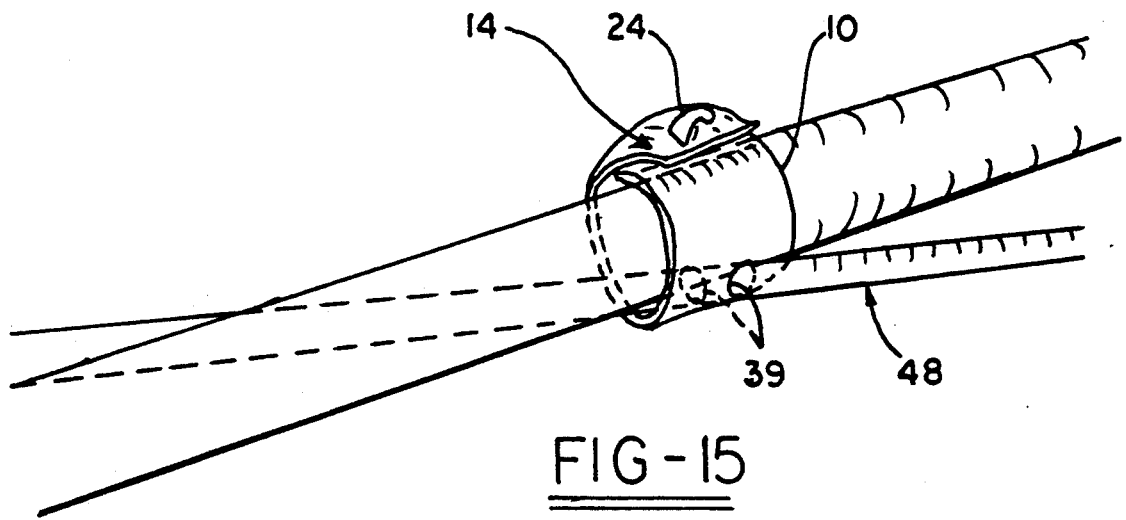
FIG. 15 is a perspective view of the louvered clamp in closed condition to hold a fitting while a rail through clamp apertures is simultaneously stabilized by the clamp.

Additionally, since the indents 38 and apertures 39 of the subject clamp allow attachment of the fitting 46 to other objects, the fitting can thus be secured in stationary position when fastened to a stationary rail, cord, line, wire or the like 48, FIG. 15.

Removal of the projection 24 from aperture 18 to permit opening of the clamp, can be accomplished by moving projection 24 rearward relative to aperture 18 or by moving aperture 18 forward relative to projection 24 or by simultaneously accomplishing both of the foregoing. In this connection, opening of the clamp may be expeditiously accomplished by inserting the blade of a tool, such as a screwdriver, through the aforementioned slot 19 and upon rocking the screwdriver forward utilizing portion 22 as the fulcrum base. End 14 (and associated aperture 18) is moved forward relative to projection 24. When the lip 24a of the projection clears the forward or apex end 18a of aperture 18, portion 16 of end 14 will automatically spring upward relative to the projection 24 while the resilient "memory" of the clamp will cause the ends 14 and 16 to spring apart relative to one another and back to the general positions illustrated in FIG. 1.

The terms and expressions which have been used are used as terms of description and not of limitation and there is no intention in the use of such terms and expressions of excluding any equivalents of any of the features shown or described or portions thereof and it is recognized that various modifications are possible within the scope of the invention claimed.

What is claimed is:

1. An improved reusable, openable-closeable clamp formed of a strap of resilient material having an arcuate body portion, longitudinal edges, and generally opposed first and second end portions, said first end portion forming a closing means and having at least one locking projection extending outwardly therefrom and the second end portion including a corresponding number of openings formed therein, through which is adapted to be received said at least one locking projection, in the tightened, closed condition of the clamp, said at least one locking projection being adapted to engage the defining periphery of said corresponding openings and hold said first and second end portions in connected condition, said at least one locking projection including means facilitating the entry of said projection into said opening for holding the clamp in closed clamping condition, and for withdrawal of said projection from said opening to permit opening of said clamp, and wherein said first end portion of said strap comprises a section bent radially outward from said body portion and then a section bent to extend generally perpendicularly from said section bent radially outward, with said locking projection being disposed on said section which extends perpendicularly to said radially outward section; said second end portion of said strap comprising a first section which extends radially outward from said body portion of said strap and then a section which is turned to extend generally at an angle of approximately 90° with respect to said first section, and then a further section, which is tipped upwardly and outwardly relative to said 90° section, said opening being disposed in said 90° section, and being of triangular configuration in plan, with said locking projection being of hook-shaped configuration, said further section having a transversely extending opening therein, wherein the improvement comprises:

a means for restraining a flexible underlying fitting, said means defined by said arcuate body portion and by a plurality of inward raised projections formed of strap material, and said projections form at least one opening in the strap with a projecting edge which surrounds each said at least one opening to contact and restrain a flexible underlying fitting against rotational and axial movement of the fitting under the clamp; and, said inward raised projections formed in a plurality of essentially parallel rows, such that the inward raised projections of a first row are staggered and offset from the inward projections of an adjacent row, each projection of a row is offset relative to two projections of the adjacent row, and one of said projections of the first row with two said projections of the adjacent row thereby form a triangle and are positioned in a triangular pitch configuration.

2. The clamp of claim 1, wherein said inward projections are half dome geometric protrusions; and each said projecting edge points away from the nearest longitudinal edge of said strap, said projecting edges acting to hold and restrain an underlying flexible fitting against rotational and axial movement of a fitting within said clamp.

3. The clamp described in claim 1, wherein the means for restraining is formed of inward hill-like projections formed in said strap material, said projections having an opening at each side thereof and having the appearance of a bridge traversing said opening; each edge of said hill-like projection surrounding said opening traversed by said bridge to form projecting edges directly contacting and restraining an underlying flexible fitting against rotation and axial slippage of the fitting.

4. The clamp of claim 1, wherein said strap has a plurality of indents on longitudinal edges thereof for adapting the clamp to receive and frictionally hold within said indents a rail, tubing, wire, cord or other object to a fitting.

5. The clamp of claim 1, wherein said strap has a plurality of apertures adapting said clamp to receive and hold within said apertures a rail, tubing, wire, cord or the like to a fitting.

6. The clamp of claim 1, wherein said at least one locking projection comprises a hook shaped portion with a locking lip at the outermost end thereof adapted to overlap and engage said corresponding number of openings formed in the second end of the strap.

7. The clamp of claim 1, wherein the clamp is formed of spring steel.

* * * * *